United States Patent
Fairclough et al.

(10) Patent No.: US 6,963,979 B2
(45) Date of Patent: Nov. 8, 2005

(54) CRYPTOGRAPHIC ACCELERATOR

(75) Inventors: Christopher Fairclough, Greystones (IE); Francis Flanagan, Rush (IE)

(73) Assignee: AEP Systems Limited, County Wicklow (IE)

(*) Notice: Subject to any disclaimer, the term of this patent is extended or adjusted under 35 U.S.C. 154(b) by 427 days.

(21) Appl. No.: 10/119,851

(22) Filed: Apr. 11, 2002

(65) Prior Publication Data

US 2002/0164019 A1 Nov. 7, 2002

Related U.S. Application Data

(63) Continuation of application No. PCT/IE00/00132, filed on Oct. 18, 2000.

(30) Foreign Application Priority Data

Oct. 20, 1999 (IE) .................................................. 990878

(51) Int. Cl.[7] .......................... G06F 11/30; G06F 12/14; H04L 9/32
(52) U.S. Cl. .......................... 713/189; 380/30; 380/708; 380/491; 380/28; 380/492; 380/37; 713/193; 713/153; 713/194
(58) Field of Search ................................ 713/189, 153, 713/193, 194; 380/30, 28, 37; 708/491, 492

(56) References Cited

U.S. PATENT DOCUMENTS

| | | | |
|---|---|---|---|
| 5,289,397 A | | 2/1994 | Clark et al. .................. 364/746 |
| 5,631,960 A | * | 5/1997 | Likens et al. ................... 380/2 |
| 5,923,893 A | | 7/1999 | Moyer et al. ................ 395/800 |
| 6,182,104 B1 | * | 1/2001 | Foster et al. ................. 708/501 |
| 6,320,964 B1 | * | 11/2001 | Callum ......................... 380/29 |
| 6,327,661 B1 | * | 12/2001 | Kocher et al. .............. 713/193 |
| 6,378,072 B1 | * | 4/2002 | Collins et al. .............. 713/187 |

FOREIGN PATENT DOCUMENTS

| | | |
|---|---|---|
| EP | 0502782 A2 | 9/1992 |
| EP | 0525968 A2 | 2/1993 |
| WO | WO99/14881 | 3/1999 |
| WO | WO99/39475 | 8/1999 |

OTHER PUBLICATIONS

Takagi, IEEE Trans. on Computers, 41, No. 8, Aug. 1992, pp. 949–956, A Radix–4 Modular Multiplication Hardware Algorithm . . . .

IBM Technical Disclosure Bulletin, vol. 36, No. 5, May 1993, pp. 343–346, IBM System Digital Signature Data Structure Format.

* cited by examiner

*Primary Examiner*—Gilberto Barrón, Jr.
*Assistant Examiner*—Samson B. Lemma
(74) *Attorney, Agent, or Firm*—Jacobson Holman PLLC

(57) ABSTRACT

A cryptographic accelerator (1) has a host interface (2) for interfacing with a host sending cryptographic requests and receiving results. A CPU (3) manages the internal logical unit in an exponentiation sub-system (7) having modulator exponentiators (30). The exponentiators (30) are chained together up to a maximum of four, in a block (20). There are ten blocks (20). A scheduler uses control registers and an input buffer to perform the scheduling control.

22 Claims, 3 Drawing Sheets

CRYPTOGRAPHIC ACCELERATOR

This is a continuation of PCT/IE00/00132 filed Oct. 18, 2000 and published in English.

FIELD OF THE INVENTION

The invention relates to a cryptographic accelerator.

PRIOR ART DISCUSSION

In any electronic exchange of information between two or more participants, cryptography is intended to provide some or all of the following assurances.

Confidentiality
   No one except the intended participant(s) will have access to the information exchanged
Authentication
   Each participant is confident of the identities of the other participant(s)
Integrity
   The information exchanged between the participants will have nothing added or removed without the participants being aware of the adulteration
Non-Repudiation
   A sender of information cannot deny having sent the information, and a recipient cannot deny its reception.

These assurances are essential to the growth of secure electronic communications. The biggest problem associated with conventional (symmetric/single key) cryptography relates to the distribution of the secret keys used to encrypt and decrypt data in secure communication sessions. Modern public key encryption, which uses public/private key pairs, overcomes this problem. However, public key encryption carries a very large computational overhead in comparison to that associated with conventional encryption. As a way of limiting this overhead, many cryptographic protocols only use public key encryption as a mechanism to allow participants setting up a secure communication session to exchange secret keys. The exchanged keys are then used for conventional encryption to encrypt the bulk of data to be transmitted in the session.

Modern PC systems, with suitable software, are capable of implementing both conventional and public key encryption mechanisms in order to complete secure electronic transactions (for example Web shopping or Internet banking). The computing overheads and physical security required are not beyond the resources of a typical end-user PC provided that it does not need to carry out a large number of such transactions within a short period of time. However, this is not the case for the commercial server systems with which these transactions are conducted. E-commerce server systems are naturally expected to be able to conduct large numbers of transactions within short periods of time, and must be able to guarantee a high degree of physical security for this activity.

One of the emerging protocols used for electronic commercial transactions is SET (Secure Electronic Transactions). Depending on the nature of the transactions involved, a single electronic 'purchase' can involve a many as fourteen separate public key operations on different systems in up to four separate organisations. Clearly, since the computational requirements of public key encryption are high, this activity becomes a bottleneck orders of magnitude over and above the normal overheads of the administration and logistics of computer based commercial order-processing systems.

It is therefore an object of the invention to provide a cryptographic accelerator which provides the level of cryptographic computation required and has a high throughput.

SUMMARY OF THE INVENTION

According to the invention, there is provided a cryptographic accelerator comprising a host interface comprising means for interfacing with a host system having applications requesting cryptographic operations, means for performing exponentiation, and means in the host interface for routing request responses to the host system, characterised in that, the accelerator comprises a plurality of logical units, including an exponentiation sub-system, and the accelerator further comprises a CPU connected between the host interface and the logical units and comprising means for managing operation of the logical units.

In one embodiment, the exponentiation subsystem comprises an ASIC.

In one embodiment, the exponentiation subsystem comprises individual modular exponentiators, and means for dynamically forming a group of modular exponentiators chained together.

In one embodiment, the exponentiation subsystem comprises means for chaining modular exponentiators within a group, wherein all chains within a group are of the same length.

In one embodiment, the exponentiation subsystem comprises means for executing exponentiation based on the Montgomery algorithm.

In one embodiment, each modular exponentiator has a size of 544 bits. In one embodiment, the exponentiation sub-system comprises a scheduler, an exponentiator input buffer, and an exponentiator output buffer, and the scheduler comprises means for routing scheduling instructions to the exponentiators via the input buffer.

In one embodiment, the instructions include a status field for insertion of an error in the output buffer if a result should be discarded.

In one embodiment, the instructions include a control field with a group mode instruction for a chaining configuration.

In one embodiment, the control field instruction is associated with a particular group.

In one embodiment, the instructions include a block identifier field for insertion in the output buffer of an identifier of the block which generated the result.

In one embodiment, the instructions include a group identifier field for insertion in the output buffer of an identifier of the group which generated the result.

In one embodiment, the exponentiation sub-system comprises means for accessing control registers, including a register for an instruction causing the scheduler to commence initialisation of groups with exclusion of certain error-prone groups.

In one embodiment, a control register stores linear feedback shift register contents.

In one embodiment, the scheduler and the input buffer comprises means for transferring dummy data to exponentiators in the absence of real data.

In one embodiment, the host interface comprises a daemon and a plurality of APIs for a host system, and said daemon comprises means for managing request queues on a per-logical unit basis.

In one embodiment, the CPU comprises a parser comprising means for breaking each request into commands, for automatically determining a required response data space, and for allocating said space.

In one embodiment, each parser is associated with a particular logical unit and comprises means for breaking the commands into strings of a desired format and size for the associated logical unit.

In one embodiment, the CPU comprises a plurality of micro sequencers, each comprising means for either routing parsed command strings to the destination logical unit or for performing the requested operation itself.

In one embodiment, the logical units comprise a block cipher unit comprising means for implementing bulk and/or symmetric cipher operations.

In one embodiment, the logical units comprise a random number generator comprising means for generating a random number bit stream, and for performing a statistical analysis to ensure that the bits are random.

In one embodiment, the CPU comprises means for using the random number bit stream to generate prime numbers and for storing the prime numbers in configurable pools.

In one embodiment, the accelerator further comprises a bus for communication of the CPU with the logical units.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
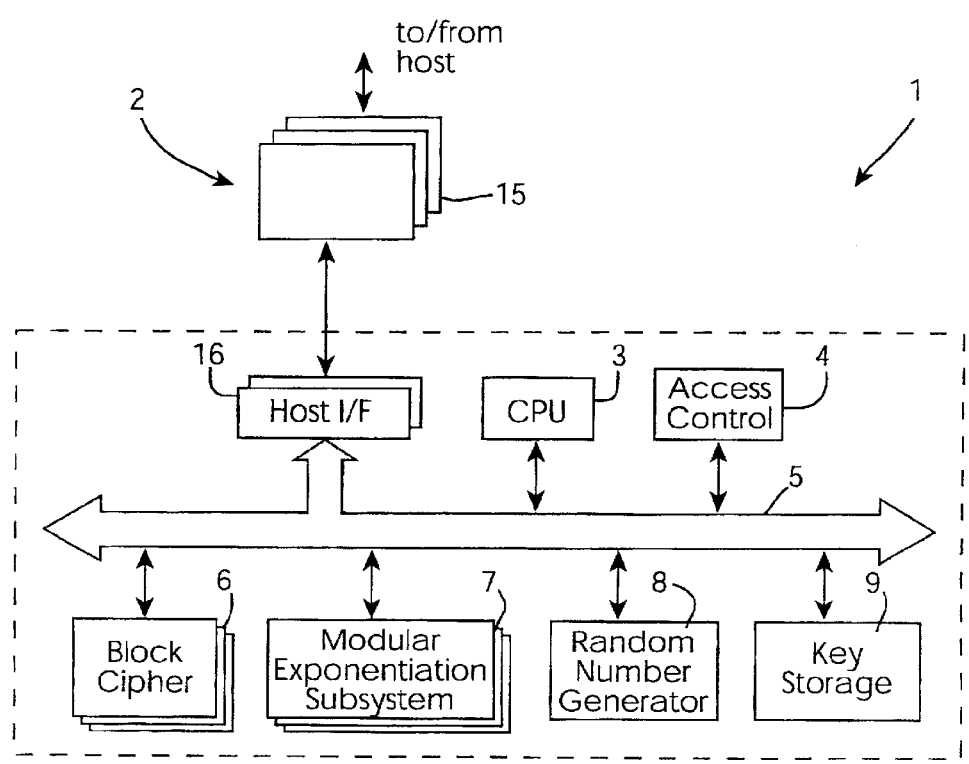
FIG. 1 is a block diagram illustrating a cryptographic accelerator of the invention.

Referring to FIG. 1, a cryptographic accelerator 1 of the invention is illustrated. The accelerator 1 comprises a host interface 2 for interfacing with a host server such as a server performing on-line secure transactions. A CPU 3 handles host interfacing, device drivers, and authentication. It also implements some cryptography algorithms. An access control block 4 provides tamper resistance and includes components ranging from physical tamper-detection devices such as microswitches to intelligent access control functions. An internal bus 5 supports DMA transfer between the logical units within the accelerator 1. A block cipher function 6 is a PLD to implement encryption and decryption. It is particularly suitable for encryption of large blocks of data. The accelerator 1 also comprises a modular exponentiation subsystem 7, a random number generator 8, and a key storage function 9.

In more detail, the host interface 2 comprises a daemon and APIs 15 executing on a host server and also a PCI interface 16 comprising hardware and software within an accelerator circuit physically separate from the host system, shown by interrupted lines.

The host server has multiple applications. Each application is multi-threaded and interfaces to an instance of a library in the server, the library being associated with the accelerator 1 via sockets which are managed by a single daemon.

The applications route requests to the accelerator 1, and each request is either:

(a) a synchronous request in which the application waits for a response, or (b) an asynchronous request in which the application does not wait and must be reactivated to receive the response.

The daemon manages the request via the sockets and a device driver connected to the PCI interface 16. The daemon is programmed with attributes of the logical units 6–9 of the accelerator 1 and it manages the requests in queues for the logical units.

The CPU 3 comprises:

six micro engines (micro sequencers), two high speed memory interfaces, an Advanced RISC Microprocessor (ARM) with real time multitasking capability, The ARM has a message parser for each logical unit, and each parser parses signals for a logical unit, as set by the daemon. Each parser breaks requests into commands, determines what data space will be required for the resulting response, and reserves the appropriate space in the CPU 3. Each parser also breaks the commands into strings of a desired size and format for the associated logical unit.

Each micro engine of the CPU 3 is independently programmable and routes commands from the queues generated by the parsers to the relevant logical units. Also, each micro engine may, instead of routing the commands to the destination logical unit, actually perform the requested operation itself. An example is a hashing operation. The micro engines also receive responses (via the bus 5) from the logical units and route them to the host server applications via the relevant sockets.

The block cipher function 6 comprises firmware for implementing bulk/symmetric cipher, for example those specified in the DES (Data Encryption Standard).

The modular exponentiation sub-system (logical unit) 7 performs exponentiation, described in detail below.

The random number generator 8 is programmed to generate a random bit stream and to perform a statistical analysis to ensure that the bits are indeed random. The random bit stream is routed to the CPU 3 via the bus 5, and the CPU 3 stores the bits in memory. The CPU 3 then uses the stored random bits to determine prime numbers. It stores the prime numbers in different, configurable pools for use in performing cryptography operations.

Figure 2:
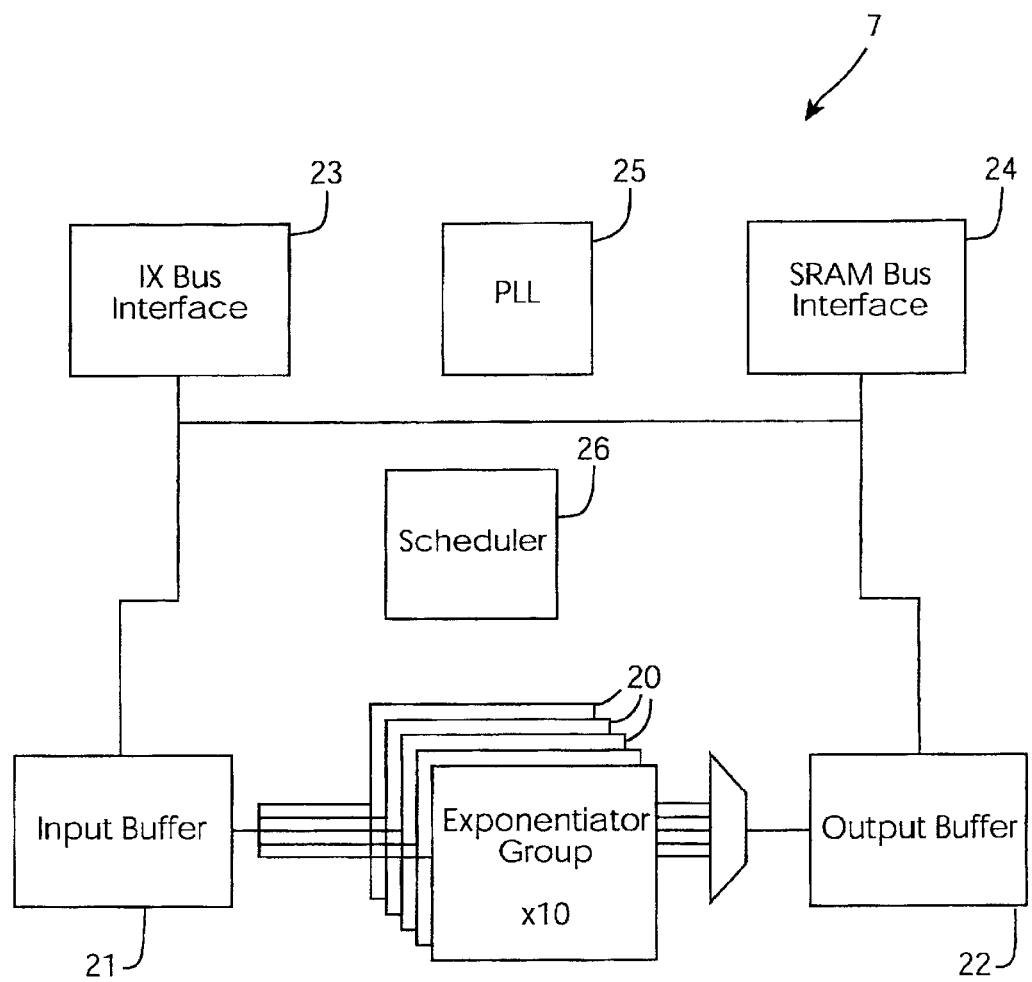
FIG. 2 is a diagram illustrating a modular exponentiation subsystem of the accelerator at a high level.
Figure 3:
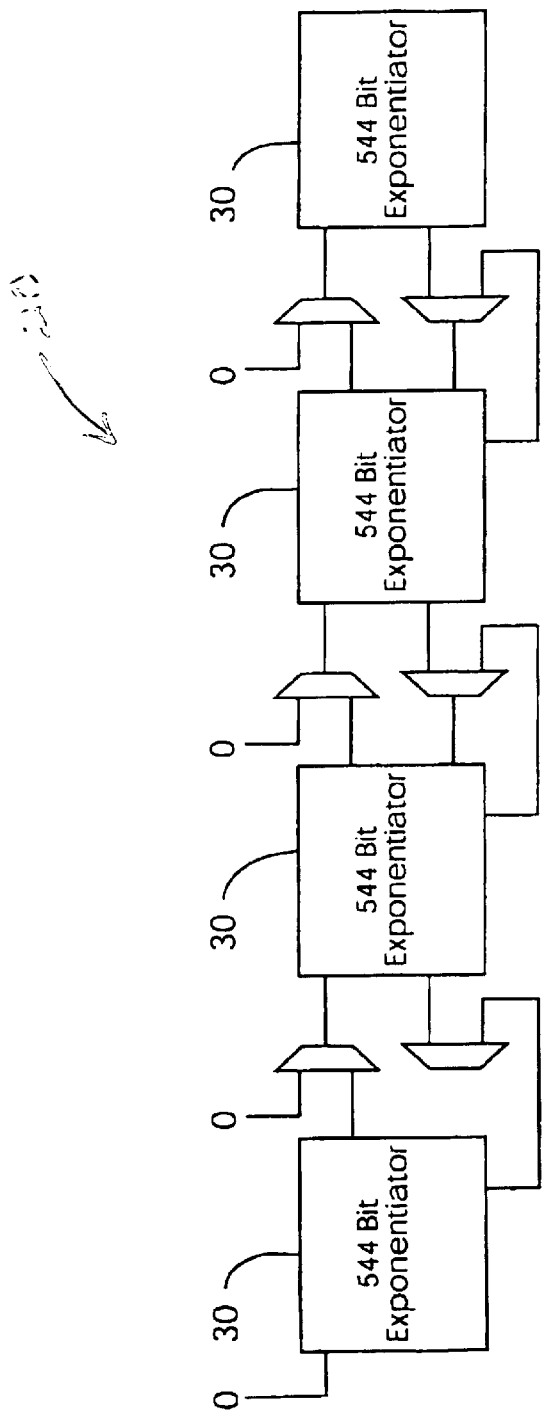
FIG. 3 is a diagram showing the structure of a group of the subsystem of FIG. 2.

Referring to FIG. 2, the exponentiator sub-system 7 comprises an ASIC comprising ten exponentiator groups 20. Each of the exponentiator groups 20 includes four 544 bit exponentiator blocks 30, as shown in FIG. 3. The subsystem 7 also comprises an input buffer 21, an output buffer 22, an IX bus interface 23, a SRAM bus interface 24, a PLL 25, and a scheduler 26. The SRAM interface allows access to off-chip SRAM.

The blocks 30 may be operated alone or dynamically chained together up to the size of a group providing for 2174 bit exponentiations. This is illustrated in FIG. 3. The primary clock is generated by the on-chip PLL 25. Each 544 bit exponentiator 30 is a unit capable of completing each Montgomery multiply of a number up to 542 bits in 1089 clock cycles. As the units are configured in groups of four, each group provides for exponentiations of up to 2174 bits.

The 544 bit block with maximum 4 block chain size has been chosen to provide near to optimal utilisation of the silicon resources for most common key sizes. Each group can be configured as a number of chains as shown in Table 1 below. However all chains within a group are configured to the same size, and for optimal performance all exponents within a group are of approximately the same number of bits as the sub-system 7 will asynchronously terminate once all exponentiations have completed.

TABLE 1

Standard Modulus Sizes vs. Chain Length

| Modulus Size | Blocks Per Chain | Chains per Group |
|---|---|---|
| 256 | 1 | 4 |
| 512 | 1 | 4 |
| 768 | 2 | 2 |
| 1024 | 2 | 2 |
| 1536 | 3 | 1 |
| 2048 | 4 | 1 |

Scheduling

The scheduler 26 controls the allocation of work to each of the groups 20. Data is transferred to the input buffer 21 complete with all of the information necessary to control the group 20 in performing the exponentiation. The scheduler 26 allocates the work from the input buffer to the first free group. As the software has no control over which group will carry out the exponentiations or how long it will take to process each block, data is transferred with a block identifier. The block identifier is returned in the output buffer with the exponentiation result. Additionally a group identifier is returned allowing the group 20 responsible for a particular result to be identified.

The sub-system 7 only transfers data to the output buffer 22 when a valid input buffer is available. Dummy data and keys are used in the absence of valid data to process. This mechanism is intended to keep the sub-system 7 busy at all times processing a range of data and therefore increases the difficulty of any attempts at power or tempest-type analysis.

IX Bus Interface 23

This interfaces with the IX bus 5, which is an open bus defined by Level-1 communications for direct interfacing of communication chips in bridges and routers. It is a FIFO based bus driven at the processor end by micro-code on the IXP-1200 and an entire family of networking chips including GigaBit Ethernet.

Input and Output Buffers

The input buffer 21 is arranged as follows.

| Field | Exponentiator Unit | MSB | LSB |
|---|---|---|---|
| DATA | Exponentiator 0 | 543 | 0 |
| | Exponentiator 1 | 1087 | 544 |
| | Exponentiator 2 | 1631 | 1088 |
| | Exponentiator 3 | 2175 | 1632 |
| EXPONENT-1 | Exponentiator 0 | 2719 | 2176 |
| | Exponentiator 1 | 3263 | 2720 |
| | Exponentiator 2 | 3807 | 3264 |
| | Exponentiator 3 | 4351 | 3808 |
| R2 MOD M | Exponentiator 0 | 4895 | 4352 |
| | Exponentiator 1 | 5439 | 4896 |
| | Exponentiator 2 | 5983 | 5440 |
| | Exponentiator 3 | 6527 | 5984 |
| (M + 1)/2 | Exponentiator 0 | 7071 | 6528 |
| | Exponentiator 1 | 7615 | 7072 |
| | Exponentiator 2 | 8159 | 7616 |
| | Exponentiator 3 | 8703 | 8160 |
| GBCS | | 8767 | 8704 |
| BPC | | 8831 | 8768 |

The output buffer 22 is arranged as follows:

| Field | Exponentiator Unit | MSB | LSB |
|---|---|---|---|
| RESULT | Exponentiator 0 | 543 | 0 |
| | Exponentiator 1 | 1087 | 544 |
| | Exponentiator 2 | 1631 | 1088 |
| | Exponentiator 3 | 2175 | 1632 |
| GBCS | | 2239 | 2176 |
| BPC | | 2303 | 2240 |

The data returned from the exponentiator is normally the correct result but may for some specific input data be the result+m and require a single subtract to normalise it to the correct range.

Group ID, Block Identifier, Control and Status (GBCS)

This is a 64 bit field present in both the input and output buffers. These 64 bits are organised as follows:

| Field | Bits |
|---|---|
| Status | 7:0 |
| Control | 15:8 |
| Block Identifier | 31:16 |
| Group Identifier | 63:32 |

Status (7:0)

7:1 Reserved

0 BPC Downstream Status

In the input buffer 21 the BPC bit in the status field is ignored. In the output buffer 22 the BPC bit will be set if an error in the downstream transfer to the input buffer was detected and the result should therefore be discarded.

Control (15:8)

15:10 Reserved

9:8 Exponentiator Group Mode

The exponentiator group mode field in the input buffer 21 determines the group chaining configuration. In the output buffer 22 this field is reset.

| Mode | Control(9:8) | Configuration |
|---|---|---|
| 0 | 00 | 4 × 544 |
| 1 | 01 | 2 × 1088 |
| 2 | 10 | Undefined |
| 3 | 11 | 1 × 2176 |

Block Identifier (31:16)

A 16 bit sequence number set by software in the input buffer and set in the output buffer so that results in the output buffer may be associated with requests sent via the input buffer.

Group Identifier (63:32)

Group identifier, set in the output buffer 22 to indicate which exponentiator group 20 generated a particular result. A single bit of the 10 lower order bits will be set to uniquely identify the group. This field is ignored in the input buffer.

BPC (Block Parity Check)

This is a 64 bit block parity check used to check for data transfer errors. In the input buffer 21 this is set to the XOR of the input data and GBCS. Should an error be detected in the downstream transfer to the device a BPC Downstream Status error is indicated in the GBCS status field of the output buffer. In the output buffer the BPC is generated by the device. On the receive side the BPC may be calculated for the output buffer and compared with the generated BPC to detect transmission errors.

Arrangement of Per Block Operands

All per exponentiator data, keys, and modulus are arranged in the buffers starting at bit 0 of the exponentiator block in which the operand starts and running up contiguously. This means that for a group configured for 4×512 bit exponentiations bits 543:512 would be set to zero in the input buffer, whereas for 2×1024 bit exponentiations these bits are used in the middle of the data. For standard modulus sizes the arrangement is as follows:

| 256 | 512 | 768 | 1024 | 2048 |
|---|---|---|---|---|
| 255:0 | 511:0 | 767:0 | 1023:0 | 2047:0 |
| 799:544 | 1055:544 | 1855:1088 | 2111:1088 | NONE |
| 1343:1088 | 1599:1088 | NONE | NONE | NONE |
| 1887:1632 | 2143:1632 | NONE | NONE | NONE |

Configuration Registers

Four 32-bit configuration registers are accessible by the scheduler 26 via a configuration register interface. These are CFGREG0, CFGREG1, CFGREG2 and CFGREG3.

CFGREG0

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | RES | | | | | | | | | | | | | | | | | | | | | | GRPEN | | | | | | | | | |

| Bits | Name | Description |
|---|---|---|
| 31:10 | RES | Reserved. |
| 9:0 | GRPEN | Exponentiator group enable/disable.<br>0: Disable.<br>1: Enable. |

CFGREG0 is read/writable. All writes to CFGREG0 cause the scheduler 26 to go through its initialisation sequence at the end of which scheduling will commence with group 9 in decreasing order. The GRPEN field within CFGREG0 provides a mechanism to exclude particular groups from being scheduled. Each of the 10 bits in GRPEN allows its respective group to be enabled/disabled (1=enabled, 0=disabled). In the event that an exponentiation result is found to be in error, the exponentiator group responsible can be identified using the group identifier field within the GBCS quad-word in the output buffer. That group can then be excluded from scheduling by resetting the appropriate bit in the GRPEN field.

CFGREG1

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | LFSRM1 | | | | | | | | | | | | | | | | LFSRM0 | | | | | | | | | | | | | | | |

| Bits | Name | Description |
|---|---|---|
| 31:16 | LFSRM1 | Linear feedback shift register constant for Mode 1. |
| 15:0 | LFSRM0 | Linear feedback shift register constant for Mode 2. |

CFGREG1 holds the linear feedback shift register constants for mode 0 and mode 1. These must be initialised to appropriate values prior to starting the scheduler with a write to CGFREG0:
LFSRM00x0F6A
LFSRM10x08BA

CFGREG2

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | LFSRM3 | | | | | | | | | | | | | | | | RES | | | | | | | | | | | | | | | |

| Bits | Name | Description |
|---|---|---|
| 31:16 | LFSRM3 | Linear feedback shift register constant for Mode 3. |

CFGREG2 holds the linear feedback shift register constant for mode 3. This must be initialised to an appropriate value prior to starting the scheduler with a write to CGFREG0:
LFSRM30x0148

CFGREG3

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | RES | | | | | | | | | | | | | | | | | | | | | | | | | | | | | | | |

| Bits | Name | Description |
|---|---|---|

CFGREG3 is reserved for future use.

Initialisation

Initialisation of the sub-system 7 requires the following steps:

1. Linear Feed Shift Register Initialisation

Write of 0x08BA0F6A to CFGREG1.

Write of 0x01480000 to CFGREG2.

2. Scheduler Initialisation

In normal operation all ten exponentiator groups 20 are enabled by a write of 0x000003FF to CFGREG0. Should a group be known to be faulty it may be prevented from being scheduled by resetting the appropriate bit in CGFREG0.

3. Exponentiator Group Initialisation

Each exponentiator group 20 must be initialised by executing an initialisation operation. The initialisation operation consists of a specific input data block and operation mode:

DATA=0

EXPONENT−1=0

R2MODM=0

M+½=0

MODE=0

Assuming all ten exponentiator groups have been enabled the first ten operations must be initialisation operations. The first ten results contain post-reset data which is undefined and as such should be discarded. The block and group identifier fields of the GBCS may be used to verify that each exponentiator group has executed an initialisation operation. Known test data is cycled through each group to verify its operation prior to putting the device 1 into use at each power up.

It will be appreciated that the accelerator 1 provides for very fast operation in a simple and effective manner. The CPU 3 implements unusual cryptographic algorithms, and the block cipher 6 performs efficient symmetric encryption of large blocks of data. The subsystem 7 is extremely important to performance of the accelerator 1 as a whole. It provides a very high throughput per gate count because of use of small exponentiators. The interconnects in the block/chain/group structure allow selection of the size of multipliers with only serial data streams. The buffers operate effectively to group operations of the same modulus and similar exponent size into a group totalling up to 2048 modulus bits. The buffers also calculate the Montgomery residue of data, submit grouped data to the groups 20, convert the final Montgomery residue to a result, and submit dummy data to the groups 20 in the absence of sufficient real data.

A security feature is that of product verification and ownership. Prior to leaving the factory each cryptographic accelerator is sealed and digitally signed to verify its integrity. The micro-controller which monitors the tamper detection circuitry operates in transit to the customer.

When the product is delivered to the customer, as far as the firmware is concerned the box is the property of the manufacturer. The customer should connect his own computer to the serial line interface, touch his own Crypto-ibutton to the blue dot receptor and obtain the box's verification message. This includes the serial number of the box, the mode of initial configuration, and the signature. This message should be verified using known public keys of the manufacturer. The customer should then send a digitally signed transfer of ownership request to the manufacturer who will sign the request and return it to the customer. This signed message is input to the unit and the transfer of ownership is complete.

After the transfer of ownership the accelerator has become the exclusive "property" of the holder of the crypto-ibutton used in the transfer. The owner of this button may authorise other users at various access levels as required.

This verification and transfer of ownership protocol may be repeated between departments, crypto-officers etc. or just to replace old keys with new ones as needed. Once ownership has been transferred the unit will cease to recognise any configuration or logon requests signed by its previous owner and the transfer of ownership is recorded in a permanent audit trail.

As the transfer of ownership is permanent and irrevocable the loss of private keys with which to re-configure the unit is a substantial problem which will necessitate return to factory and complete re-initialisation with complete loss of audit trail. The manufacturer therefore signs all units prior to shipment with two messages generated using separate private keys in separate secure locations. A message generated using either of these keys may be used to transfer ownership of the unit. It is suggested that customers adopt a similar approach.

The invention is not limited to the embodiments described, but may be varied in construction and detail. For example, the host interface may comprise several cascaded SCSI devices instead of a PCI interface.

What is claimed is:

1. A cryptographic accelerator comprising:
    a host interface for interfacing with a host system to receive requests for cryptographic operations and to route responses to the host system;
    a plurality of logical units including an exponentiation sub-system;
    a CPU connected between the host interface and the logical units for managing operation of the logical units;
    said exponentiation sub-system including,
        a plurality of exponentiation groups, each group having a plurality of modular exponentiators interconnected in series that define a size of each group, each exponentiator being capable of performing a multiply operation;
        an input buffer for the exponentiation groups; and
        a scheduler for delivering control instructions to the input buffer to dynamically configure the exponentiators so that they are dynamically and serially chained together within the groups, each chain having a number of exponentiators up to the size of the exponentiation groups to form at least one chain in each group.

2. A cryptographic accelerator as claimed in claim 1, wherein the exponentiation subsystem comprises an ASIC.

3. A cryptographic accelerator as claimed in claim 1, wherein the exponentiation subsystem comprises means for chaining modular exponentiators within a group, wherein all chains within a group are of the same length.

4. A cryptographic accelerator as claimed in claim 1, wherein the exponentiation subsystem comprises means for executing exponentiation based on the Montgomery algorithm.

5. A cryptographic accelerator as claimed in claim 3, wherein each modular exponentiator has a size of 544 bits.

6. A cryptographic accelerator as claimed in claim 1, wherein the instructions include a status field for insertion of an error in the output buffer if a result should be discarded.

7. A cryptographic accelerator as claimed in claim 1, wherein the instructions include a control field with a group mode instruction for a chaining configuration.

8. A cryptographic accelerator as claimed in claim 7, wherein the control field instruction is associated with a particular group.

9. A cryptographic accelerator as claimed in claim 1, wherein the instructions include an exponentiator block identifier field for insertion in the output buffer of an identifier of the exponentiator which generated the result.

10. A cryptographic accelerator as claimed in claim 1, wherein the instructions include a group identifier field for insertion in the output buffer of an identifier of the group which generated the result.

11. A cryptographic accelerator as claimed in claim 1, wherein the exponentiation sub-system comprises means for accessing control registers, including a register for an instruction causing the scheduler to commence initialisation of groups with exclusion of certain error-prone groups.

12. A cryptographic accelerator as claimed in claim 11, wherein a control register stores linear feedback shift register contents.

13. A cryptographic accelerator as claimed in claim 1, wherein the scheduler and the input buffer comprises means for transferring dummy data to exponentiators in the absence of real data.

14. A cryptographic accelerator as claimed in claim 1, wherein the host interface comprises a daemon and a plurality of APIs for a host system, and said daemon comprises means for managing request queues on a per-logical unit basis.

15. A cryptographic accelerator as claimed in claim 14, wherein the CPU comprises a parser comprising means for breaking each request into commands, for automatically determining a required response data space, and for allocating said space.

16. A cryptographic accelerator as claimed in claim 15, wherein each parser is associated with a particular logical unit and comprises means for breaking the commands into strings of a desired format and size for the associated logical unit.

17. A cryptographic accelerator as claimed in claim 1, wherein the CPU comprises a plurality of micro sequencers, each comprising means for either routing parsed command strings to the destination logical unit or for performing the requested operation itself.

18. A cryptographic accelerator as claimed in claim 1, wherein the logical units comprise a block cipher unit including means for implementing bulk and/or symmetric cipher operations.

19. A cryptographic accelerator as claimed in claim 1, wherein the logical units comprise a random number generator including means for generating a random number bit stream, and for performing a statistical analysis to ensure that the bits are random.

20. A cryptographic accelerator as claimed in claim 19, wherein the CPU includes means for using the random number bit stream to generate prime numbers and for storing the prime numbers in configurable pools.

21. A cryptographic accelerator as claimed in claim 1, wherein the accelerator further comprises a bus for communication of the CPU with the logical units.

22. A cryptographic accelerator comprising:
    a host interface for interfacing with a host system to receive requests for cryptographic operations and to route responses to the host system;
    a plurality of logical units including an exponentiation sub-system;
    a CPU connected between the host interface and the logical units for managing operation of the logical units;
    said exponentiation sub-system including,
        a plurality of exponentiation groups, each group having a plurality of modular exponentiators interconnected in series that define a size of each group, each exponentiator being capable of performing a multiply operation;
        an input buffer for the exponentiation groups;
        a scheduler for delivering control instructions to the input buffer to dynamically configure the exponentiators so that they are dynamically and serially chained together within the groups, each chain having a number of exponentiators up to the size of the exponentiation groups to form at least one chain in each group; and
        said scheduler configuring all chains within a group to have a same size and transferring data to the exponentiators with a relevant exponentiator block identifier, said block identifier being returned with a respective exponentiation result.

* * * * *